(12) United States Patent
Lee et al.

(10) Patent No.: US 8,006,684 B2
(45) Date of Patent: Aug. 30, 2011

(54) SUPERHEATED STEAM GRILL

(75) Inventors: Kuo-Liang Lee, Taipei (TW); Lu-Shan Chang, Taipei (TW); Shih-Yao Liu, Taipei (TW); Shih-Wei Tung, Taipei (TW)

(73) Assignee: Star Comgistic Capital Co. Ltd., Taipei (TW)

( * ) Notice: Subject to any disclaimer, the term of this patent is extended or adjusted under 35 U.S.C. 154(b) by 931 days.

(21) Appl. No.: 12/000,115

(22) Filed: Dec. 10, 2007

(65) Prior Publication Data

US 2009/0145418 A1 Jun. 11, 2009

(51) Int. Cl.
*A21B 1/08* (2006.01)

(52) U.S. Cl. ............ 126/20; 99/375; 99/330; 219/401; 219/524

(58) Field of Classification Search ............ 126/20, 126/21 A; 219/401, 524; 99/330, 345, 372, 99/375; 426/510
See application file for complete search history.

(56) References Cited

U.S. PATENT DOCUMENTS

| 3,732,396 | A | * | 5/1973 | Tucker | 219/401 |
| 3,901,443 | A | * | 8/1975 | Mitsui et al. | 239/102.2 |
| 4,700,685 | A | * | 10/1987 | Miller | 126/20 |
| 4,771,163 | A | * | 9/1988 | Thiboutot | 219/400 |
| 5,943,949 | A | * | 8/1999 | Sham et al. | 99/450 |
| 6,310,326 | B1 | * | 10/2001 | Wang | 219/401 |
| 6,530,308 | B1 | | 3/2003 | Lin | |
| 7,091,454 | B2 | * | 8/2006 | Cho et al. | 219/401 |
| 7,220,944 | B2 | * | 5/2007 | Miller et al. | 219/388 |

* cited by examiner

*Primary Examiner* — Steven B McAllister
*Assistant Examiner* — Sarah Suereth
(74) *Attorney, Agent, or Firm* — Schmeiser Olsen & Watts LLP

(57) ABSTRACT

A superheated stream grill includes a heating tray to serve as a heat source for heating and cooking the food materials. In addition, it also provides a function of heating food materials by using a superheated stream. The grill has a heating system for generating the superheated stream. The heating system atomizes the water molecules to form mist by means of the supersonic vibration, and then the mist is heated and converted into the superheated stream. The superheated stream is injected and sprayed onto the food materials. In this way, the mouth feeling of the food materials after cooking is much better and the time for cooking is also reduced.

9 Claims, 4 Drawing Sheets

SUPERHEATED STEAM GRILL

BACKGROUND OF THE INVENTION

1. Field of the Invention

The present invention relates to a grill or the like, and in particular, two heat sources including a heating tray and a superheated steam are provided. Therefore, the food materials cooked by the grill are desalted and defatted by the superheated steam. Also, the time for cooking the food materials is reduced.

2. Description of Prior Art

The conventional electric grill operates to directly heat the tray by an electric heating tube, and then the heated tray is used for cooking food materials. During the heating and grilling operations, since the water contained in the food materials cooked by the electric grill continuously loses, the thus-cooked food materials become dry and tough and thus have bad mouth feeling.

In view of the drawbacks of the conventional grill, a steam grill designed by Lin and disclosed in U.S. Pat. No. 6,530,308, is proposed to solve the above-mentioned drawbacks. This patent document refers to a method for supplying suitable amount of water to the food materials being heated, so that the food materials can still keep desirable elasticity and mouth feeling after being cooked by such a steam grill.

The steam grill disclosed in the U.S. Pat. No. 6,530,308, comprises a body 1, an upper lid 2, a water-storing member 3 provided at the upper lid 2, a heating section 5 and a dripping controller 4 provided within the body 1, and a grilling section 12 provided beneath the heating section 5. The dripping controller 4 is provided within the water-storing member 3 for controlling the amount of water drops entering the heating section 5. Further, in the heating section 5, a plurality of heating tubes 52 are provided for heating the water, so that the water can be converted into steam. In this way, the food materials disposed in the grilling section 12 can be continuously supplied with the moisture, so that the food materials still keep considerable elasticity and better mouth feeling.

According to the above, in order not to make the food materials dry and tough after being cooked by electric grill, the U.S. Pat. No. 6,530,308, has already disclosed a method in which the steam is supplied to supplement the water contained in the food materials being heated.

However, in the above-mentioned steam grill, only the heating tray 11 serves as the heat source for heating the food materials. The steam just increases the moisture of the food materials, but has no significant effect on heating.

SUMMARY OF THE INVENTION

The primary object of the present invention is to provide a superheated steam grill, in which the superheated steam is not only used to supply the necessary moisture to the food materials, but also provide a heating effect. Therefore, the time for cooking the food materials can be reduced.

The way to achieve the above objects relies on a heating system capable of generating the superheated steam. Such heating system first atomizes the water molecules to form the mist by means of supersonic vibration. The mist is heated and converted into the superheated steam. Then, the superheated stream is injected and sprayed onto the food materials.

The superheated steam grill of the present invention is provided with a heating tray in an inner chamber, so that the food materials to be cooked can be disposed on the heating tray. The superheated steam grill further comprises a mist generator for generating atomized water molecules, and a heating tube having a passage in communication with the inner chamber.

The atomized water molecules provided by the mist generator can enter the heating tube for the subsequent heating, and then enter the inner chamber via the heating tube. Since the potential heat of the atomized water molecules is increased, so that they become the superheated steam at the time of heating.

With this arrangement, the food materials disposed in the inner chamber can be simultaneously cooked by two heating sources including the heating tray and the superheated steam. The superheated steam not only provides the necessary moisture to the food materials being heated, but also reduces the time for cooking.

In practice, the mist generator can be constituted of a water-storing member and a supersonic vibrator provided in the water-storing member. The water within the water-storing member can be atomized by means of the supersonic vibration. Then, the wind generated by a fan guides the atomized mist into the heating tube, and then the mist is heated therein to become the superheated steam. The superheated steam enters the inner chamber via the heating tube.

An embodiment of the above-mentioned heating tube can be constituted of a mist conduit, an electric heating tube and a heat-conducting wrapping capable of transferring the heat generated by the electric heating tube to the mist conduit. Alternatively, the heating tube can be constituted of an electric heating tube and a mist conduit contacting with each other, so that the heat generated by the electric heating tube can be directly transferred to the mist conduit by contact conduction.

Further, in order to increase the efficiency in the entrance of the mist into the heating tube, in practice, a fan can be additionally provided to generate sufficient wind to blow the mist into the heating tube.

DETAILED DESCRIPTION OF THE INVENTION

In order to better understand the objects, structure, characteristics and functions of the present invention, a detailed description related thereto will be made with reference to the accompany drawings.

The superheated stream grill of the present invention has a heating tray and, in addition, uses a superheated steam in heating. The superheated steam is used to desalt and defat the food materials and facilitates the heating effect, so that the consumers can eat healthier food materials. On the other hand, the cooperation of the two heat sources can reduce the time for cooking.

Figure 1:
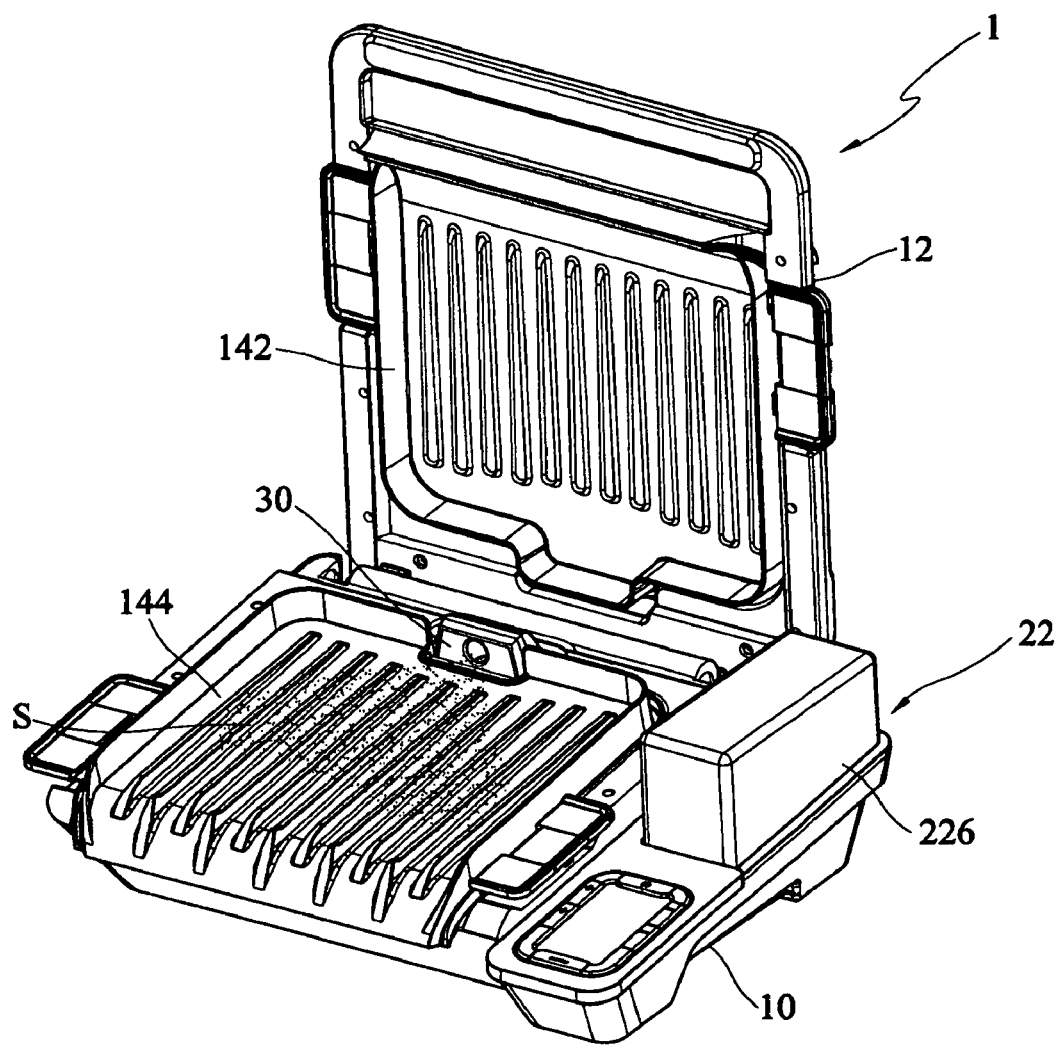
FIG. 1 is a perspective view showing the open state of the superheated steam grill in accordance with the present invention.
Figure 2:
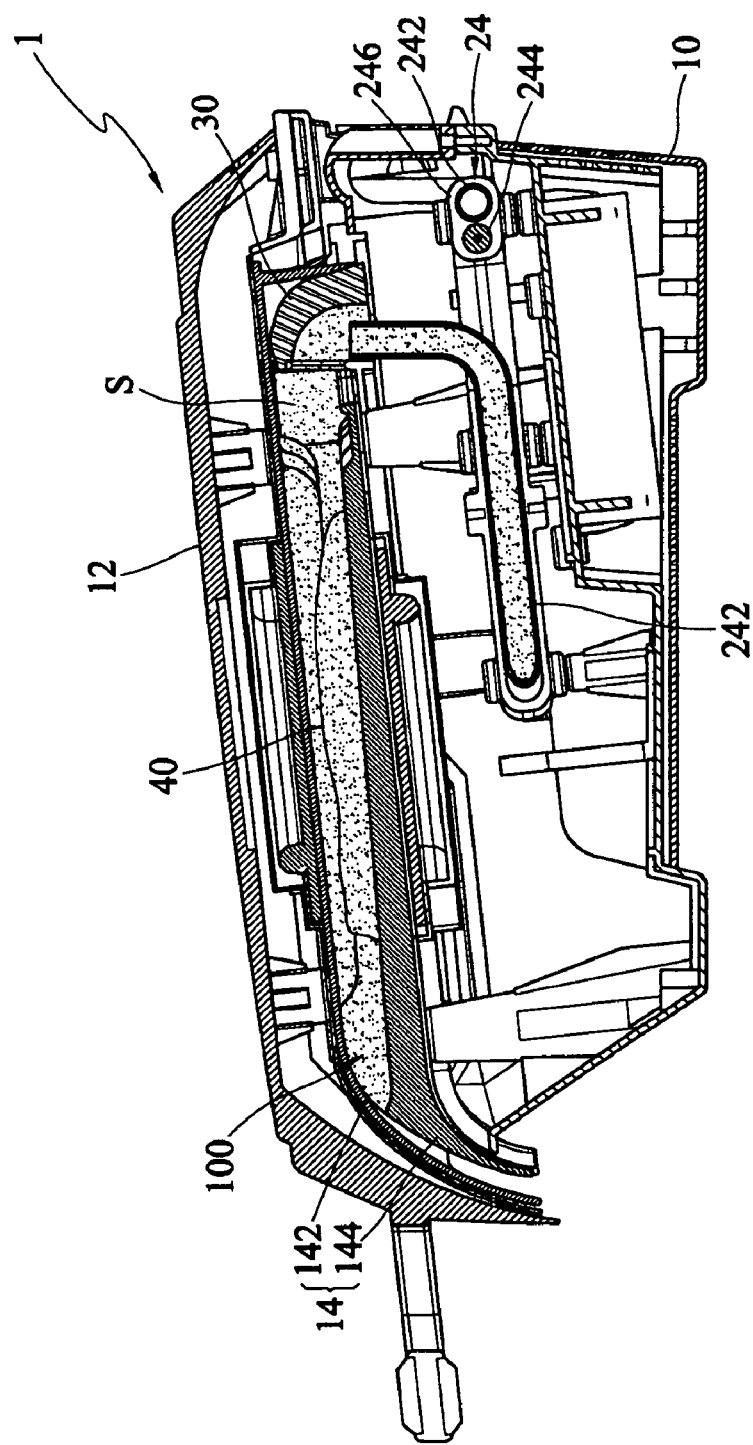
FIG. 2 is an assembled cross-sectional view showing the closed state of the superheated steam grill in accordance with the present invention.

With reference to FIG. 1 and FIG. 2, the superheated steam grill 1 shown in the drawings includes a body 10. An upper lid 12 is pivoted to one side of the body 10 and can be moved to an open position and a closed position with respect to the body 10. When the upper lid 12 is at the closed position, an inner chamber 100 can be formed between the upper lid 12 and the body 10.

In the inner chamber 100, a heating tray 14 is provided for heating the food materials 40 placed thereon. Specifically, the heating tray 14 comprises a first tray 142 and a second tray 144 provided on the closing faces of the upper lid 12 and the body 10, respectively. When the upper lid 12 moves to the closed position, the first tray 142 and the second tray 144 are closed with each other, so that the food materials 40 placed therebetween can be heated and cooked by both trays.

Figure 3:
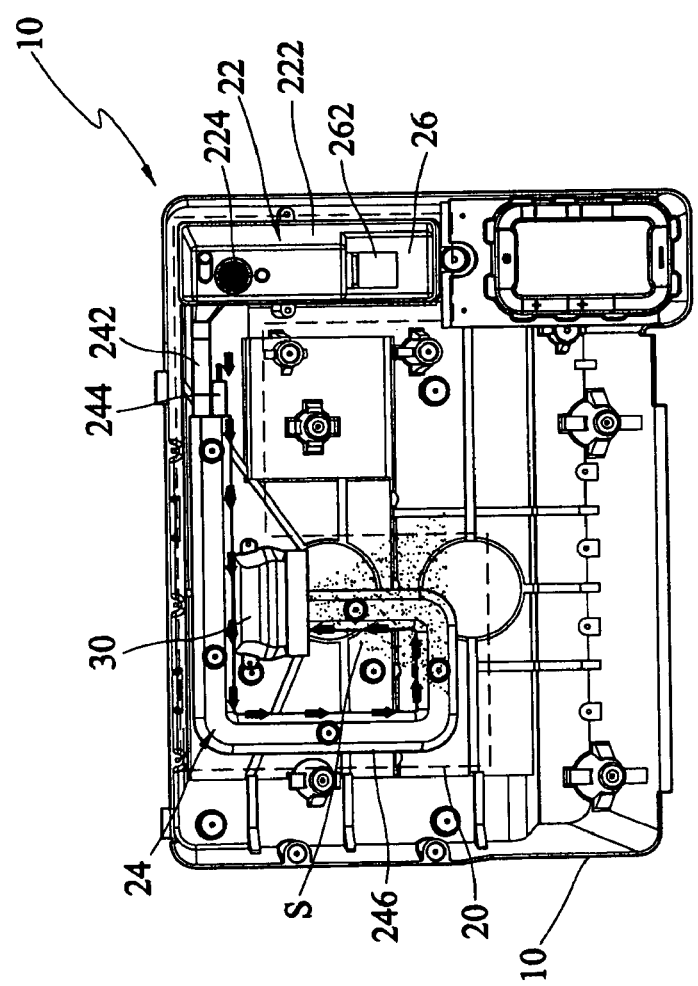
FIG. 3 is a top view showing the mist generator and the heating tube after a portion of the superheated steam grill of the present invention is removed.

With reference to FIG. 3, any of the first tray 142 and the second tray 144 is provided with at least one venting hole to serve as a passage for the superheated stream S injected into the inner chamber 100. With this arrangement, the food materials 40 placed on the heating tray 14 and to be cooked can be supplied with moisture by the superheated stream S while being simultaneously heated by the superheated stream S.

In order to provide the superheated stream S, the grill 1 is provided with a heating system for generating the superheated stream S. The superheated system atomizes the water molecules to form mist by means of the supersonic vibration. Then, the mist is heated and converted into the superheated stream S. The superheated stream S is injected and sprayed onto the food materials 40. The heating system comprises a mist generator 22, a heating tube 24 and a fan 26.

Figure 4:
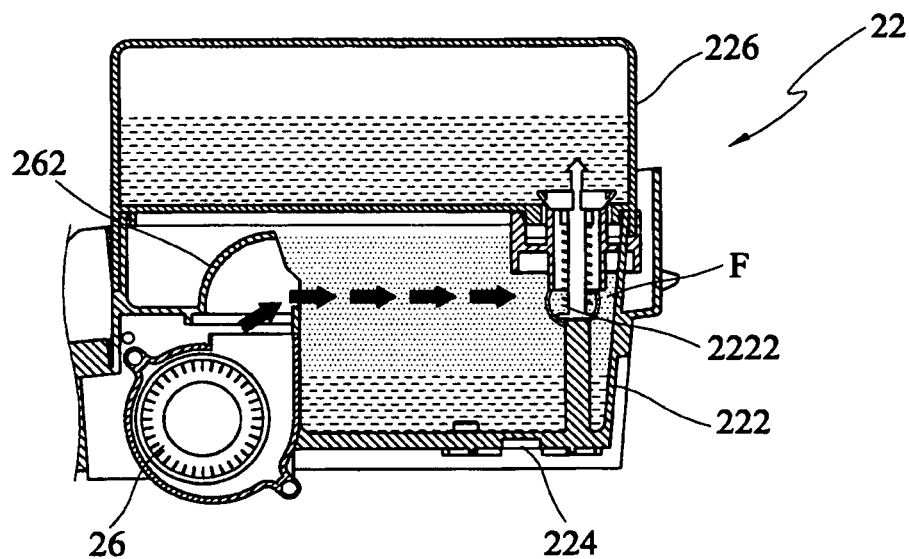
FIG. 4 is a schematic view showing the structure of the mist generator of the superheated steam grill in accordance with the present invention.

With reference to FIG. 4, the mist generator 22 has a function of generating atomized water molecules, and comprises a water-storing member 222 and a supersonic vibrator 224 provided in the water-storing member 222. The supersonic vibrator 224 atomizes the water stored in the water-storing member 222 to form the mist by means of the supersonic vibration. Since the potential heat of the atomized water molecule is increased, it can be converted into the superheated stream S at the time of heating. In order to let the mist generated in the water-storing member 222 enter the heating tube 24 for the subsequent heating, a mist outlet 2222 is provided on the water-storing member 222.

In order to continuously supply the water to the water-storing member 222, a separable water tank 226 can be provided on the water-storing member 222 for supplying the necessary water. In addition, in order to facilitate the observation of the amount of water within the water-storing member 222, the housing of the water-storing member 222 can be made of a transparent material.

Figure 5:
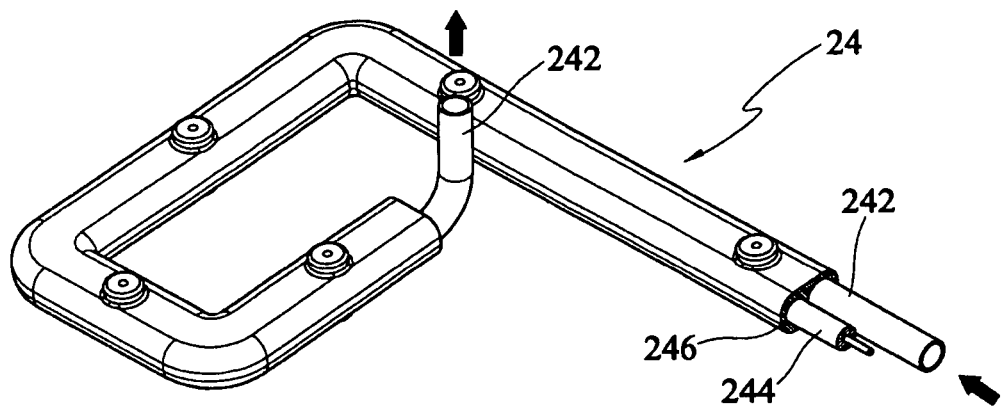
FIG. 5 is a schematic view showing the structure of the heating tube of the superheated steam grill in accordance with the present invention.

With reference to FIG. 5, the heating tube 24 heats the mist F generated by the mist generator 22 to convert the mist into the superheated stream S and guides the superheated stream S into the inner chamber 100. The heating tube 24 has a passage therein for communicating with the inner chamber 100 and is combined with a spray head 30 at the venting hole. With this arrangement, the superheated stream S can be injected and sprayed into the inner chamber 100 via the spray head 30. One specific structure of the heating tube 24 comprises a mist conduit 242, an electric heating tube 244 and a heat-conducting wrapping 246 capable of transferring the heat generated by the electric heating tube 244 to the mist conduit 242. The heat-conducting wrapping 246 is made of materials having good heat conductivity, such as copper, aluminum or the like, by which the heat generated by the electric heating tube 244 can be rapidly transferred to the mist conduit 242. Thus, the mist conduit 242 can provide a heating effect on the mist F entering the passage.

In addition to the indirect heat conduction made by the heat-conducting wrapping 246, in practice, the heating tube 23 can be constituted of an electric heating tube 244 and a mist conduit 242 contacting with each other. With this arrangement, the heat generated by the electric heating tube 244 can be directly transferred to the mist conduit 242 by contact conduction.

One end of the mist conduit 242 leads to the water-storing member 222, and the other end thereof leads to the inner chamber 100. As for the fan 26, it can be additionally arranged in the interior or exterior of the water-storing member 222 for providing the wind, by which the mist F generated in the water-storing member 222 by the supersonic vibration can be guided into the mist conduit 242 for the subsequent heating. As a result, the mist F is heated and converted into the superheated stream S. Then, the superheated stream enters the inner chamber 100 along the inner passage of the mist conduit 242. The suitable type of the fan 26 may be selected from a blower fan or axial fan but is not limited thereto. Further, the outside of the fan 26 is provided with an air-guiding mask 26. The air-guiding mask 262 is used to guide the direction of the airflow, thereby to improve the efficiency in the entrance of the mist into the mist conduit 242. Therefore, the mist F sufficiently enters the mist conduit 242 for the subsequent heating.

In practice, the end of the mist conduit 242 leading to the inner chamber 100 can be connected to the venting hole on any of the first tray 142 and the second tray 144, so that the superheated stream S can be injected into the inner chamber 100 via the venting hole. If the first tray 142 and the second tray 144 are provided with two or more venting holes thereon, the mist conduit 242 can be designed as a manifold, so that the mist conduit 242 can be connected to all the venting holes. With this arrangement, the superheated stream S can be injected into the inner chamber 100 via different positions to provide the moisture and heat to food materials 40.

According to the above, the superheated stream grill 1 of the present invention is the one having a heating tray 14 for heating the food materials 40. In addition, the supersonic vibration 224 provided in the mist generator 22 atomizes the water stored in the water-storing member 222 to form the mist F by the supersonic vibration. Then, the fan 26 is used to guide the mist F into the heating tube 24, so that the mist is heated therein to form the superheated stream S. The superheated stream S is injected and sprayed into the inner chamber 100. Since the potential heat of the atomized water molecule is increased, it is converted into the superheated stream S at the time of heating, thereby to serve as another heat source for heating the food materials 40. Therefore, the grill 1 of the present invention has two heat sources including the heating tray and the superheated stream S. Not only the time for cooking is reduced, but also the food materials 40 are desalted and defatted by means of the superheated stream S. Moreover, the food materials still keep appreciate moisture and better mouth feeling.

Although the present invention has been described with reference to the foregoing preferred embodiment, it will be understood that the invention is not limited to the details thereof. Various equivalent variations and modifications can still be occurred to those skilled in this art in view of the teachings of the present invention. Thus, all such variations and equivalent modifications are also embraced within the scope of the invention as defined in the appended claims.

What is claimed is:

1. A superheated steam grill comprising
a body having an upper lid movable to an open position and a closed position with respect to the body, an inner chamber formed between the upper lid and the body with the upper lid at the closed position;
a heating tray provided in the inner chamber for placing and heating food materials thereon;
a mist generator for generating atomized water molecules; and
a heating tube having a passage in communication with the inner chamber, the atomized water molecules generated by the mist generator entering the passage to form a superheated stream, the superheated stream being delivered into the inner chamber via the passage;
wherein the heating tube is combined with a spray head for spraying the stream into the inner chamber;
wherein the heating tube comprises a mist conduit, an electric heating tube extending substantially parallel to the mist conduit and a heat-conducting wrapping for transferring the heat generated by the electric heating tube to the mist conduit;
wherein the atomized water molecules generated by the mist generator are guided into the heating tube by the wind of a fan;
wherein the fan has an air-guiding mask for guiding the direction of the airflow.

2. The superheated stream grill according to claim 1, wherein the upper lid is pivoted to the body.

3. A superheated stream grill, comprising:
a body having an upper lid movable to an open position and a closed position with respect to the body, an inner chamber formed between the upper lid and the body with the upper lid at the closed position;
a water-storing member;
a supersonic vibrator provided in the water-storing member for atomizing the water stored in the water-storing member to form the mist;
a mist conduit with one end leading to the water-storing member and the other end leading to the inner chamber, thereby to guide the mist generated in the water-storing member to the inner chamber;
an electric heating tube for heating the mist conduit, thereby to heat the mist entering the inner chamber via the mist conduit to form the superheated stream; and
a fan for providing the wind to guide the mist generated in the water-storing member into the mist conduit for the subsequent heating so as to form the superheated stream, the thus-formed superheated stream is delivered into the inner chamber;
wherein the water-storing member comprises a water tank for supplying the necessary water to the water-storing member;
wherein the end of the mist conduit leading to the inner chamber is provided with a spray head for spraying the stream into the inner chamber;
wherein the mist conduit and the electric heating tube are simultaneously wrapped in a heat-conducting wrapping, thereby to indirectly transfer the heat generated by the electric heating tube to the mist conduit via the heat-conducting material;
wherein the mist generated in the water-storing member is guided into the mist conduit by the wind of a fan;
wherein the fan has an air-guiding mask for guiding the direction of the airflow.

4. The superheated stream grill according to claim 3, wherein the water-storing member has a transparent housing to allow the observation of the amount of the water stored therein.

5. The superheated stream grill according to claim 3, wherein the mist conduit and the electric heating tube contact with each other, thereby to transfer the heat generated by the electric heating tube to the mist conduit by contact conduction.

6. The superheated stream grill according to claim 3, wherein the upper lid is pivoted to the body.

7. A superheated stream grill, comprising:
a first tray and a second tray closable with respect to each other for heating the food materials placed therebetween, any of the first tray or the second tray provided with at least one venting hole;
a water-storing member;
a supersonic vibration provided in the water-storing member for atomizing the water stored in the water-storing member to form the mist;
a mist conduit with one end connected to the water-storing member and the other end connected to the venting hole, thereby to spray the mist generated in the water-storing member to the inner chamber via the venting hole; and
an electric heating tube for heating the mist conduit, thereby to heat the mist entering the inner chamber via the mist conduit to form the superheated stream;
wherein the water-storing member comprises a water tank for supplying the necessary water to the water-storing member;
wherein the mist conduit and the electric heating tube contact with each other, thereby to transfer the heat generated by the electric heating tube to the mist conduit by contact conduction;
wherein the mist conduit and the electric heating tube are simultaneously wrapped in a heat-conducting wrapping, thereby to indirectly transfer the heat generated by the electric heating tube to the mist conduit via the heat-conducting material;
wherein the mist generated in the water-storing member is guided into the mist conduit by the wind of a fan;
wherein the fan has an air-guiding mask for guiding the direction of the airflow.

8. The superheated stream grill according to claim 7, wherein the water-storing member has a transparent housing to allow the observation of the amount of the water stored therein.

9. The superheated stream grill according to claim 7, wherein the first tray and the second tray are provided with a plurality of venting holes thereon, and the mist conduit is combined with a manifold for simultaneously connecting to all the venting holes.

* * * * *